United States Patent [19]

Adell

[11] Patent Number: 4,578,858

[45] Date of Patent: Apr. 1, 1986

[54] INSULATED METAL EDGE GUARD AND METHOD

[75] Inventor: Robert Adell, Sunnyvale, Tex.

[73] Assignee: U.S. Product Development Company, Sunnyvale, Tex.

[21] Appl. No.: 636,880

[22] Filed: Aug. 2, 1984

[51] Int. Cl.[4] ............................................. B23P 17/04
[52] U.S. Cl. .................................... 29/527.4; 49/462; 264/171
[58] Field of Search ................. 29/527.4, 527.2, 527.1; 49/462; 264/171

[56] References Cited

U.S. PATENT DOCUMENTS

| | | | |
|---|---|---|---|
| 3,167,856 | 2/1965 | Zoller | 29/527.1 |
| 3,222,769 | 12/1965 | Le Plae | 29/527.1 |
| 3,371,447 | 3/1968 | Ruff et al. | 29/527.1 |
| 3,470,598 | 10/1969 | Berthelsen | 29/527.1 |
| 4,094,056 | 6/1978 | Takeda et al. | 29/527.2 |
| 4,259,812 | 4/1981 | Adell | 49/462 |
| 4,316,348 | 2/1982 | Adell | 49/462 |
| 4,334,700 | 6/1982 | Adell | 49/462 |
| 4,338,148 | 7/1982 | Adell | 49/462 |
| 4,365,450 | 12/1982 | Adell | 49/462 |
| 4,377,056 | 3/1983 | Adell | 49/462 |
| 4,379,376 | 4/1983 | Adell | 49/462 |
| 4,379,377 | 4/1983 | Adell | 49/462 |
| 4,387,125 | 6/1983 | Adell | 49/462 |
| 4,457,112 | 7/1984 | Adell | 49/460 |

Primary Examiner—Howard N. Goldberg
Assistant Examiner—Vernon K. Rising
Attorney, Agent, or Firm—Stephenson & Boller

[57] ABSTRACT

A process for making an insulated metal edge guard comprises extruding plastic insulating metal material onto a flat strip of metal as the strip is pulled through an extruder, coiling the insulated strip while still in the flat, uncoiling the coiled strip at the beginning of a roll-forming apparatus and feeding the insulated strip through the roll-forming apparatus to form the strip into a desired cross sectional shape for the edge guard. The process improves the efficiency of manufacturing insulated metal edge guards and it permits various embodiments, including new and unique ones, to be created efficiently. The invention has a special utility where a range of colored edge guards must be produced in varying quantities.

22 Claims, 13 Drawing Figures

INSULATED METAL EDGE GUARD AND METHOD

BACKGROUND AND SUMMARY OF THE INVENTION

This invention relates to insulated metal edge guards of the type which are applied to the trailing edges of swinging closures, such as an automobile's doors. More specifically the invention relates to a new method of making such edge guards and the edge guards produced by the method.

Edge guards of the general type to which the present invention relates are disclosed in a number of applicant's issued U.S. patents such as

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 |

There are also a number of applicant's pending patent applications relating to this subject which are known to the Patent Office by virtue of their pendency.

A door edge guard provides a protective function preventing the door edge from damage when the door is swung open against an object in the path of travel of the swinging door. Without door edge guards the painted door edges are subject to chipping, marring, and consequent adverse affects such as rusting and corrosion. This can lead to unsightly appearance and detract from the value of an automobile.

Applicant's inventions in insulated metal door edge guards serve to protectively insulate the metal of the edge guard channel from that of the door and in so doing minimize the possibility of electrochemical action occurring between the two metals, i.e. rusting. Applicant has also pointed out the advantages of having metal edge guards self-retaining.

Applicant has also developed edge guard designs in which the insulating material can be used to provide color coordination of the edge guard with the color of the swinging closure on which the edge guard is installed. For example in the case of a door edge guard, the exterior surface of the edge guard may be provided with a layer of insulating material of a desired color which coordinates with the color of the painted door.

Since automobile manufacturers offer a wide range of colors, and because each particular color-coordinated edge guard for a given door for a particular automobile model must be identified by its own unique part number even though all edge guards for that door would have the same shape, the provision of a range of colored door edge guards for the automobile industry is a monumental task.

The present invention provides a solution for efficiently performing this task.

One practice for manufacturing insulated metal edge guards comprises laminating a sheet of insulating material to a surface of a metal coil, slitting the coil into insulated strips of appropriate widths, and then roll-forming the slit insulated strips into U-shaped cross sections. With this procedure it is not possible for the insulating material to cover the side edges of the slit strip, and any covering of the side edges of the strip must be performed by a separate operation.

The availability of certain insulating materials, such as fluoridated vinyls, is only in sheets of certain minimum widths which are much larger than the widths of the individual strips which are formed into the U-shaped cross sections to form the insulated edge guards. Because the mix of color-coordinated edge guards will not be uniform, this procedure will contribute to costs associated with providing a range of color-coordinated insulated edge guards because it is necessary for the edge guard manufacturer to make certain minimum purchases from the manufacturer of the plastic material, and in widths greater than that of the metal strip forming the edge guard. Hence where a particular color may have only small usage, the edge guard manufacturer must carry a substantial inventory of that color and as can be appreciated some of this inventory may never be used, and the attendant costs constitute a waste of resources.

With the present invention the costs associated with providing such a range of edge guards are reduced to the advantage of the edge guard manufacturer, the automobile company, and the consumer who purchases an edge-guard-equipped automobile.

It has also been proposed to roll-form a metal strip of the appropriate width into a U-shaped cross section for the edge guard channel and then to run the U-shaped channel through an extruder to extrude plastic installation onto the formed U-shaped cross section. This procedure is satisfactory in the case of an edge guard where the U-shaped channel has been roll-formed into a straight shape. However where the edge guard must have a sweep so as to allow it to fit onto the trailing edge of a swinging closure which has a sweep, such as is often the case with an automobile door, it means that such sweep must be imparted by an additional operation after the plastic has been extruded onto the straight U-shaped cross section. Moreover, where multiple colors are involved the process becomes even more complicated.

The present invention improves the efficiency of manufacturing insulated metal edge guards, in general. It also especially improves the cost effectiveness of the production of insulated metal edge guards which are provided in a range of various colors for color coordination with a range of different automobile colors. The invention yields a very attractive and functional product of high quality. The inventory requirements for stocking bulk material in different colors are considerably simplified so that inventory costs are reduced.

One step in the method of the invention involves extruding plastic insulating material onto a metal strip. The automobile industry has experienced serious quality problems in extruding plastic onto metal parts, not door edge guards, and the present invention does not have any such problems associated with extruding plastic onto a metal strip which is to form a door edge guard.

Briefly the present invention comprises a process wherein plastic material is extruded onto a flat strip of metal which has a width corresponding to that which is to be used in roll-forming of an edge guard. The metal strip is pulled through an extruder in a straight line, and the plastic insulation is applied to the metal strip in an appropriate configuration. The strip is then wound into coils while still in the flat, and then the coils are unwound at a roll-former which roll forms the flat insulated strip into the desired U-shaped cross section.

The invention also provides the opportunity for creating unique edge guard constructions endowed with various decorative and functional features. By a selective extrusion of insulated plastic materials onto the metal it is possible to impart particular designs onto the metal by leaving selected portions of the metal uncovered. It is also possible to apply material to these voids, and for example a second extruder may be associated with the process to extrude material into the void which is left in a previously applied extrusion. By way of example the material which fills the void may have a light-reflective characteristic whereby a band of light-reflective material may appear in the edge guard so as to provide a light-reflective character useful at night.

Different color contrasts may be imparted to the metal channel of the edge guard while the protective and functional aspects of the edge guard are retained.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
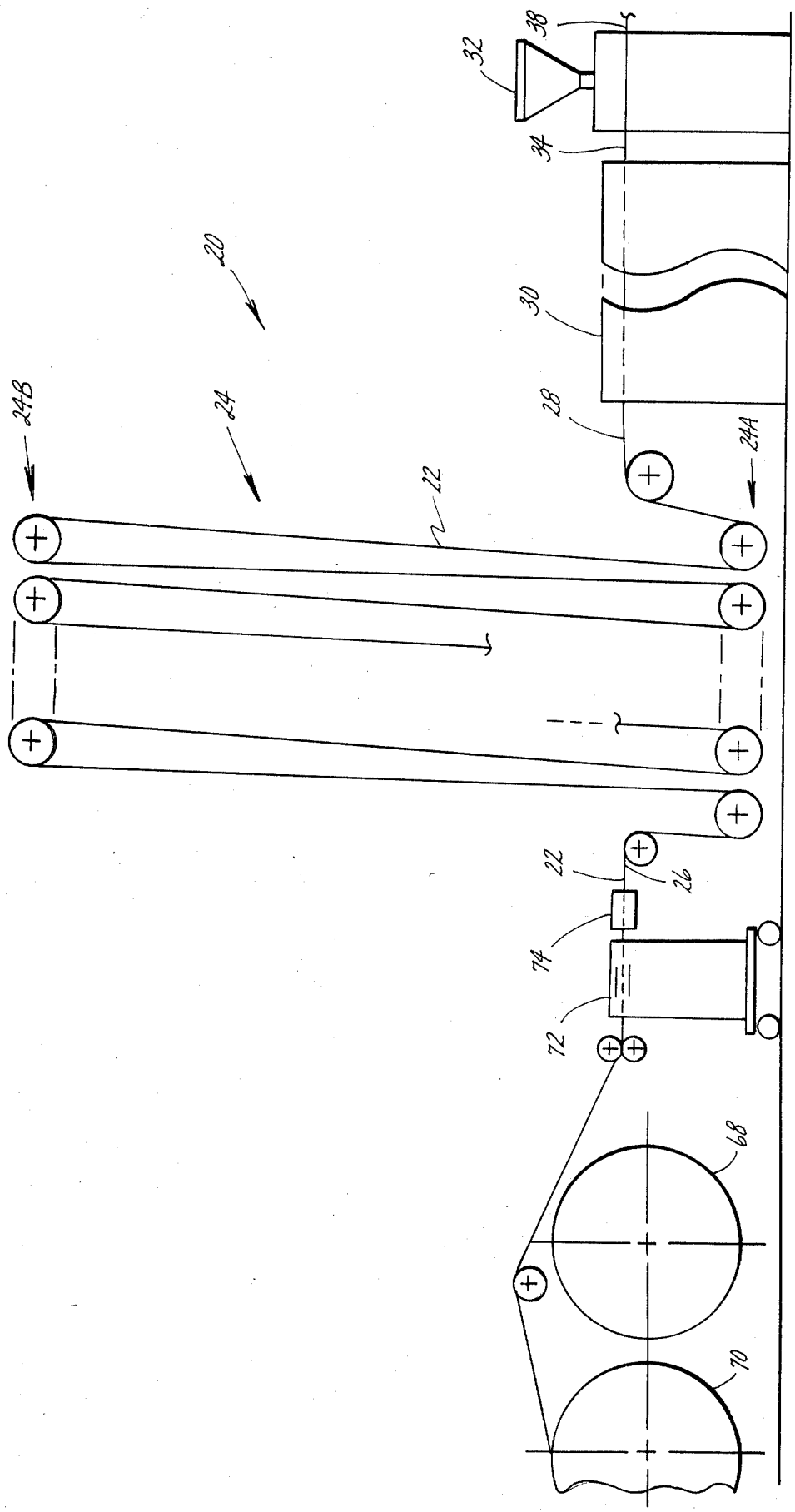
FIGS. 1 and 1A should be considered together and illustrate in front elevation apparatus for performing a part of the process of the present invention.
Figure 1A:
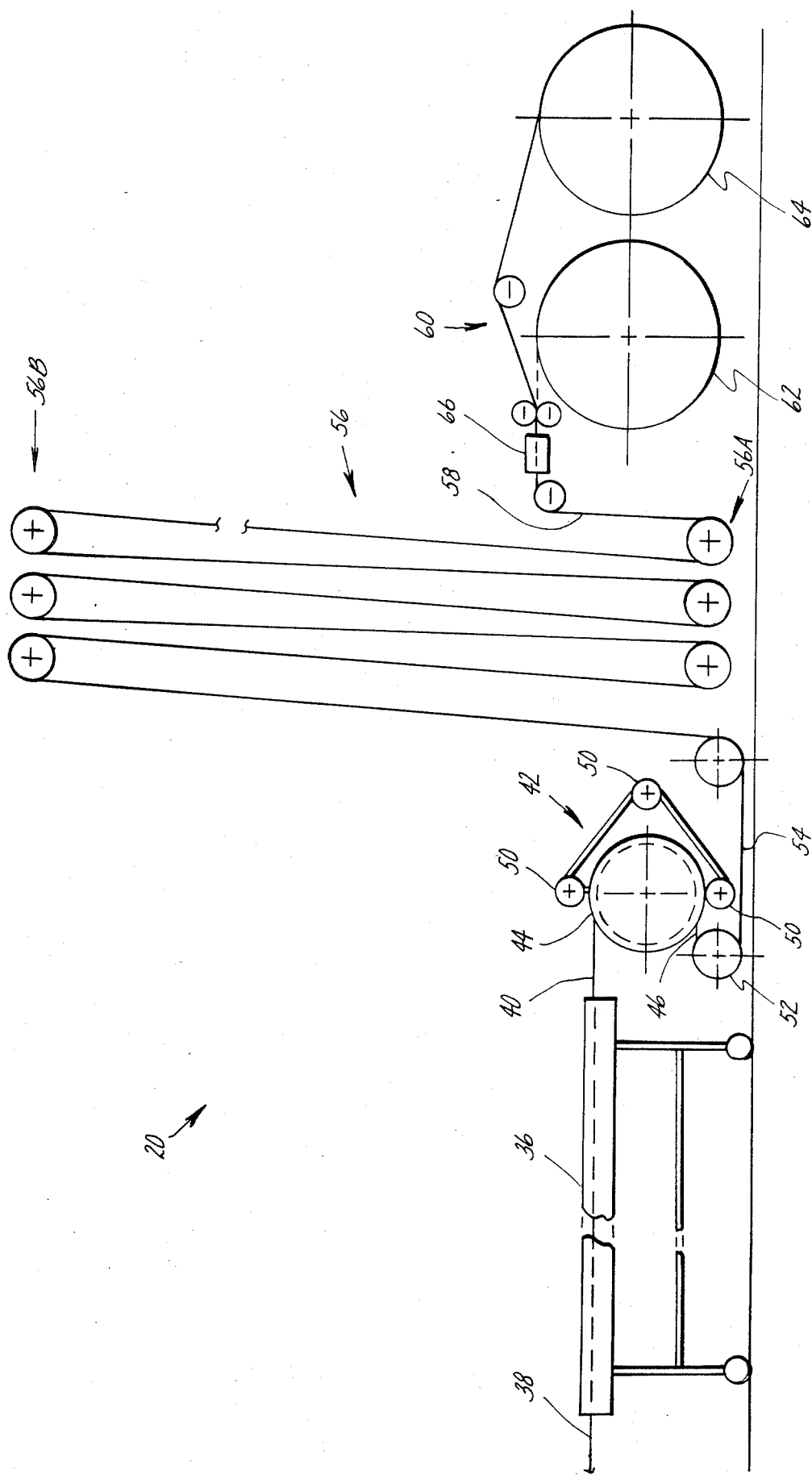

FIGS. 1 and 1A illustrate an apparatus 20 for performing part of the process of the present invention in making an insulated metal edge guard. The direction of work flow in each of FIGS. 1 and 1A is from left to right with the left hand end of FIG. 1A representing a continuation from the right hand end of FIG. 1.

As shown in FIG. 1, a metal strip 22 is introduced into a set of accumulating rolls 24 at the location indicated by the arrow 26. The strip 22 passes up and down through the rolls of set 24 in the manner shown, and it exits the set 24 at the location indicated by the arrow 28.

From point 28 the metal strip is conducted through conditioning procedures designated by the reference numeral 30 to condition the metal for subsequent application of insulating material by an extruder 32. The transition from the conditioning apparatus 30 to extruder 32 is indicated by the reference numeral 34.

Extruder 32 operates to extrude plastic insulating material onto the conditioned metal strip 22 in an appropriate configuration. The particular configuration will depend upon the requirements for the finished edge guard, and as will be seen in the ensuing description, various embodiments for configurations of plastic are shown along with the resultant edge guard constructions. As the metal strip passes through extruder 32 it remains in the flat, and it is pulled in a straight line through the extruder.

From extruder 32 the metal strip 22, which now contains plastic insulating material of an appropriate configuration, passes through a water trough 36 with the point of transition from the extruder to the water trough being indicated by the reference numeral 38. The water trough serves to cool the plastic material toward an ambient temperature.

The insulated metal strip leaves water trough 36 at the location indicated by the reference numeral 40, and it is at this point that a power driven mechanism 42 is located which is operable to pull the strip through the line. Mechanism 42 comprises a drum 44 arranged tangentially to the straight strip as it leaves the water trough with the strip extending half way around the drum to exit at the location identified by the reference numeral 46. A flexible drive belt 48 cooperatively associated with a set of wheels 50 is arranged to bear against the insulated strip as it extends semi-circumferentially around drum 44.

From point 46 the strip passes around a roll 52 and extends along the location 54 to a set of accumulating rolls 56 where the insulated strip is conducted up and down over a series of individual rolls in the manner shown. The strip exits the set of rolls 56 at the location indicated by the reference numeral 58 to coiling apparatus designated by the general reference numeral 60.

Coiling apparatus 60 is shown to comprise two spaced apart winding reels 62 and 64 onto which the strip is wound after it passes through the extrusion line. The provision of the two separate reels 62 and 64, along with an associated clamp 66 just ahead of the two reels, permits the extrusion process to run continuously after a full coil of insulated metal strip has been wound on one of the two reels.

When one of the reels has been wound full, or to any other desired amount, clamp 66 is actuated to clamp the strip. The strip is cut between the clamp and the completed coil, and during the time that the strip is clamped the accumulating rolls are operable to accumulate the continuously advancing strip as it passes through extruder 32. For this purpose the set of rolls 56 comprises a lower series 56A and an upper series 56B which are displaceable toward and away from each other and serves to accumulate material by displacing the two series of rolls further apart.

The cut end of the strip which extends from clamp 66 can be conducted onto the empty reel, such as by operator intervention, with the clamp being under the control of the operator to allow to him to pull the end of the strip from the clamp and onto the new reel. Upon threading of the new reel from the end of the strip extending from the clamp, the clamp can be released and the reel operates to begin accumulating convolutions of the metal strip to form a new coil. While the new coil is being wound the completed coil is removed from the other reel so that it will be available for use when the coil presently being wound is finished. During the time that the new coil is being wound, the two series of rolls 56A and 56B are moved close together so as to be prepared for accumulation of insulated strip material at the next reel change-over.

In this way the extrusion process can be continuously conducted while individual coils of insulated strip are made.

It will also be observed at the beginning of the line that provision is made for starting new bare metal coils into the line without the need to interrupt the flow of the strip through the extruder. In this regard the apparatus includes a pair of reels 68 and 70 at the beginning of the line. There are also a welder 72 and a clamp 74 which are associated with the reels 68 and 70 at the entrance to the set of rolls 24. Coils of metal strip of the appropriate width to be subsequently roll-formed in making the edge guards are on the reels 68 and 70. One of these coils is being unwound and pulled through the welder, clamp and the remainder of the line in FIGS. 1 and 1A. When that particular coil has been almost fully used up, clamp 74 is operated to clamp the bare metal strip. At this time two series of rolls 24A and 24B, which are analogous to the two series 56A, 56B of set 56, will be a large distance apart so as to have accumulated an appreciable length of metal strip between the individual rolls. This provides an accumulated supply which can continue to be pulled through the extruder while clamp 74 remains clamped. A fresh coil of metal strip from the other reel is introduced into the welder to butt the end of the strip which has just been pulled off the first reel. Welder 72 is operated to weld the two together. When clamp 74 is released, metal from the fresh coil is pulled from that reel and passes through the line. During the time that the new reel is being used, another new coil is placed on the vacant reel. Also during this time the set of rolls 24 operates to accumulate length of strip so that a sufficient amount will be available during the next change of coils.

In this way it is possible for the extrusion process to be continuously operated while new coils of metal strip are introduced at the beginning of the line and, as explained earlier, insulated coils are removed at the end of the line.

Figure 2:
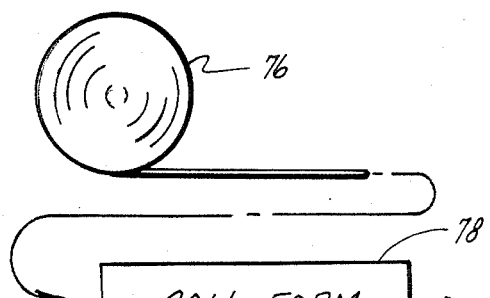
FIG. 2 is a view representing a continuation of the process from FIGS. 1 and 1A.

A coil of insulated metal strip is then processed by a roll-forming apparatus as shown in FIG. 2. The coil is designated by the reference numeral 76 and the roll-forming apparatus by the reference numeral 78. The roll-forming apparatus is conventional and comprises a series of rolls arranged to form the insulated metal strip into a desired U-shaped cross section such as depicted by the reference numeral 80 in FIG. 2 as an example. It will be observed that the insulated metal strip is wound in the flat to form the coil 76 and it is the flat insulated metal strip which is fed into the roll-forming apparatus. Accumulation of the coils of flat metal strip is more advantageous than accumulating coils of cross sections other than flat ones.

Figure 5:
FIG. 5 is a transverse cross section through one embodiment of insulated metal strip according to the present invention at the stage of the process depicted by lines 5—5 in FIG. 1A.

FIG. 5 illustrates a first exemplary embodiment 82 of insulated metal strip which may be formed with the apparatus shown in FIGS. 1 and 1A. The metal strip is designated by the reference numeral 22 and the insulating layer by the reference numeral 84. Any extrudible material of suitable characteristics may be used for the layer 84. Vinyl layers have been found particularly suitable, i.e. PVC.

The embodiment 82 comprises the insulating material 84 being applied to the full width of one major surface of the metal strip. The dimensions of the strip and insulating material are shown to be rectangular but it will be appreciated that other dimensions and proportions may be used depending upon the particular requirement for any given door edge guard. Generally a uniform thickness for the insulating layer on the order of several mills is typical so that in effect the insulating layer constitutes a film of material.

Figure 6:
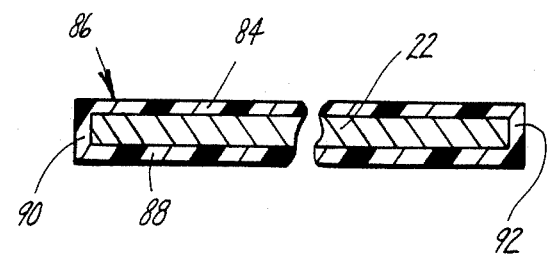
FIG. 6 is a transverse cross sectional view through another embodiment.

FIG. 6 illustrates a second embodiment 86 in which the strip continues to be identified by the reference numeral 22 and the insulating layer on the one major surface of the strip by the reference numeral 84. In this embodiment the strip, as viewed in cross section, is fully encapsulated by insulating material along not only its major surfaces but along its side edge surfaces as well. Hence on the major surface of the strip opposite layer 84 the metal is covered by a layer of insulation 88 and the side edges by insulating layers 90 and 92. Once again the thicknesses involved will depend upon the particular door edge guard but thicknesses on the order of several mills are typical.

Consideration of FIG. 6 can illustrate one of the important advantages of the invention. FIG. 6 is contrasted to an arrangement wherein a wide layer of plastic material is laminated onto a wide metal coil and the metal coil is slit into widths to be formed into the desired edge guard cross section. In the case of such a lamination it would not be possible to insulate the side edges as provided by the insulation 90 and 92 in the embodiment of FIG. 6, except by an additional operation.

Figure 7:
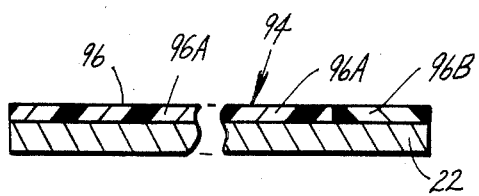
FIG. 7 is a transverse cross sectional view through a third embodiment.
Figure 8:
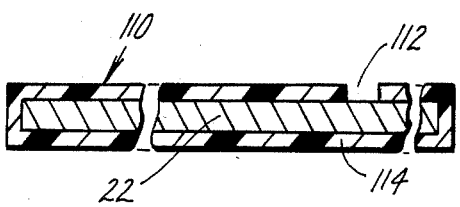
FIG. 8 is a transverse cross sectional view through a fourth embodiment.
Figure 9:
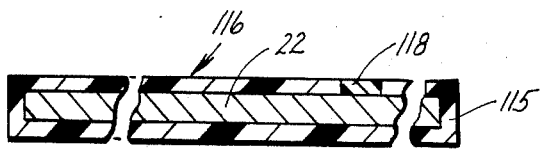
FIG. 9 is a transverse cross sectional view of a fifth embodiment.
Figure 3:
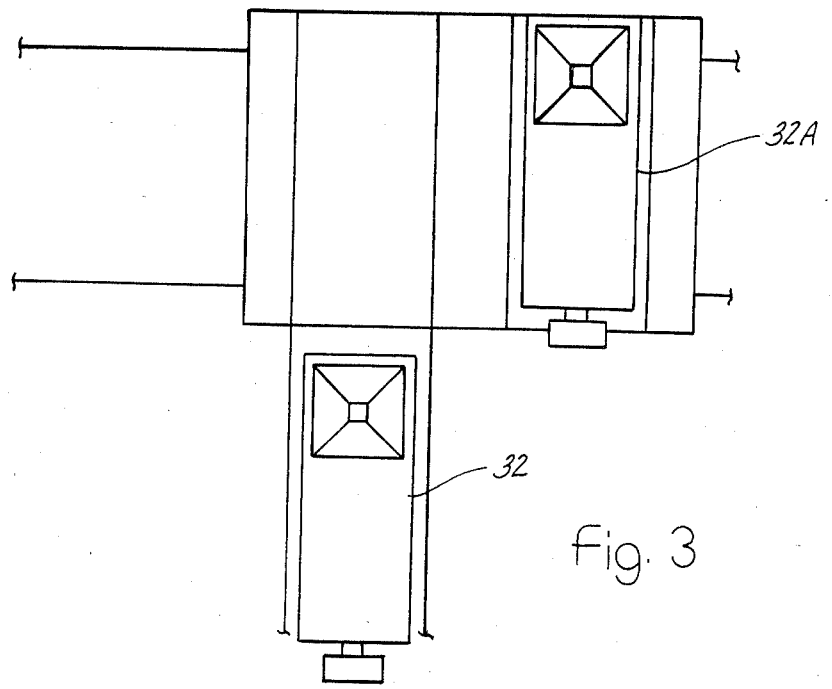
FIG. 3 is a top plan view of a portion of FIG. 1 illustrating a modification.

FIGS. 7, 8, and 9 depict further embodiments of applied insulation to a metal strip. The embodiment 94 of FIG. 7 is similar to that of FIG. 5 in that insulation is applied only to one of the major surfaces of the metal strip. It differs however in that the insulating material, which in FIG. 7 is identified by the general reference numeral 96, comprises two separate zones 96A and 96B which have different characteristics. For example these may be merely different color characteristics, or they may be other characteristics as will be explained later on in more detail. The embodiment such as FIG. 7 may be fabricated by associating with apparatus 20 a second extruder 32A as shown FIG. 3. Although FIG. 3 illustrates the second extruder 32A as displaced laterally from the line, it will be appreciated that both extruders are movably mounted for movement into and out of the line. In use both extruders will be placed in the on-line position as depicted by the extruder 32 in FIG. 2.

The procedure for fabricating the insulated strip 94 is to use one extruder to apply one of the two insulating zones 96A or 96B and the other extruder, the other. For example since the extruder 32A is shown to be upstream of extruder 32 it would be possible for extruder 32A to apply the zone 96A leaving a void along the right hand margin of the strip which is subsequently filled by material from extruder 32 to deposit the layer 96B. It is possible for the apparatus to precisely fabricate this construction and this is one of the advantages of running the strip straight through in the flat. Where material is extruded onto other than a flat shape, such a process might be impossible or at least considerably more difficult.

Figure 10:
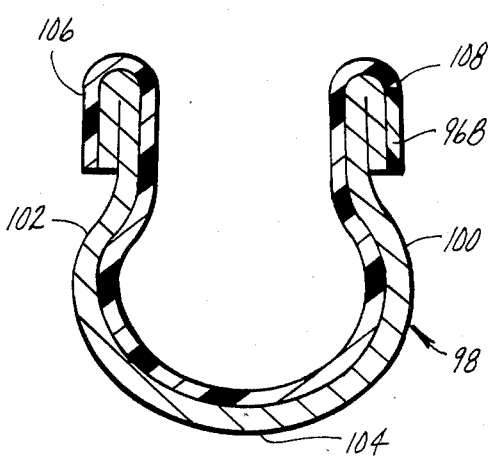
FIG. 10 is a transverse cross sectional view through an edge guard which has been formed into U-shaped cross section from the embodiment of FIG. 7.

FIG. 10 illustrates in transverse cross section an insulated metal edge guard 98 which has been fabricated from strip 94. The general shape of edge guard 98 is like that illustrated in applicant's issued U.S. Pat. No. 4,379,377. The edge guard has a generally U-shaped cross section comprising legs 100 and 102 which extend from opposite ends of a generally semi-circular base 104. The insulating material lines the full interior of the U-shaped cross section to provide protection between the metal of the edge guard and the metal of the painted door edge onto which the edge guard is installed when the edge guard is put to use. The longitudinally extending margins of the insulated metal strip are turned outwardly on the legs thereby forming double metal thickness insulated metal beads 106, 108 such that some of the insulating material appears on the exterior of the U-shaped cross section, in this example at the distal ends of the legs. By making the material 96A of a color coordinated with the color of paint on the door, for example making the color of material 96A match the color of the door, color coordination is achieved, in this case where the bead 106 at the end of leg 102 is on the outside of the door.

By providing the zone 96B along the margin of the metal strip which will be disposed on the inner leg 100, and by imparting particular characteristics to the material 96B, another advantageous effect can be obtained. Since the material 96B will be on the inside of the door edge, it will normally not be seen when the door is closed. However, when the door swings open, the layer 96B can be seen from the rear of the automobile. By imparting a light-reflective characteristic to the zone 96B the edge guard can provide a night time reflector promoting safety. If a vehicle containing the edge guard is stopped and its door swung open, headlights of another vehicle approaching from the rear will reflect off of the reflective material to hopefully draw the attention to the driver of the oncoming vehicle. The reflective band of material will appear as a vertical reflective strip along the length of the edge guard.

The reflective material may be incorporated into the material as it is extruded onto the bare metal strip, or alternatively it may be applied by another procedure. For example, it would be possible to run the material through the extruder leaving the right hand marginal edge void and subsequently filling this in with a light-reflective material by another method. The light-reflective material may comprise metal or glass flecks embodied in a transparent binder or tape which could be applied to perform this function. The reflective material could also be introduced in extrusion such as the layer 96B is deposited by the extruder by making the extruded material generally transparent material containing metal and/or glass flecks and/or any other material which would provide light reflection.

While it may be deemed desirable to incorporate the light reflective material it will be appreciated that principles of the invention insofar as any embodiment, such as embodiment 98, is concerned, are not limited to the inclusion of light-reflective material, and an embodiment such as 98 could simply involve different colored zones 96A, 96B.

It is also possible however that multiple colored (more than two) zones could be used involving multiple extruders. The extrusion is still conducted while the material is in the flat and the flat insulated material is subsequently roll-formed into the U-shaped cross section. Moreover while the example shows particular dimensions and locations for the respective zones 96A, 96B, it will be appreciated that these may also be varied in width and in pattern. For example, when the embodiment 82 is formed into a cross sectional shape like that shown in FIG. 10, the same identical colored beads will be present at the distal ends of both inner and outer legs.

FIG. 8 shows a further embodiment of metal strip 110 which has been substantially encapsulated like embodiment 86 except for the provision of a void zone of narrow width 112 on one of the major surfaces.

Figure 11:
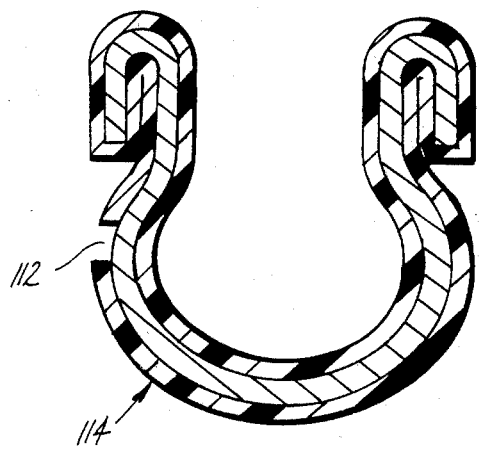
FIG. 11 is a transverse cross sectional view through a U-shaped edge guard which has been formed from the embodiment of FIG. 8.

FIG. 11 shows the fabrication of strip 110 into a cross section of an edge guard 114 which is similar to the cross section shown in FIG. 10. By void 112, the external appearance of the insulated metal edge guard will be the color of the encapsulating plastic material 115 except for a thin band of metal which is visible because of the void 112. In FIG. 11 the void 112 is shown to be disposed centrally of the outer leg to provide a decorative aspect. When voids are left for exposure it is desirable that the metal be a decorative one, such as stainless steel, yet the edge guard insulation is made color coordinated with the painted door whereby the void 112 provides a decorative metallic line to accent the outward appearance. It will be appreciated that the number, size and location of any such void will depend upon the desired edge guard appearance. Once again this brings out an advantage of the invention since the locations and sizes of such voids can be precisely controlled while extruding the plastic material onto the flat metal strip.

Figure 12:
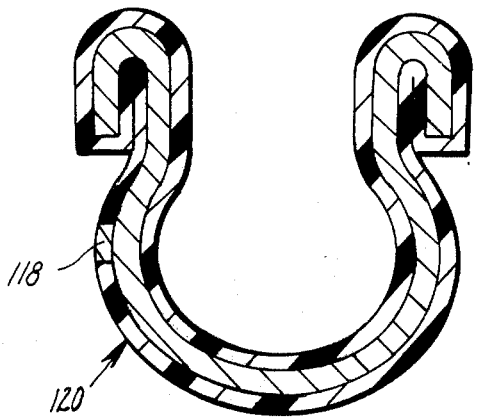
FIG. 12 is a transverse cross sectional view through an edge guard fabricated from the embodiment of FIG. 9.

FIG. 9 shows still another embodiment of insulated strip 116 which is similar to embodiment 110 except that the void space 112 has been filled by insulating material 118 having a different characteristic from the other insulating material 115. For example, this may be simply a difference in color whereby instead of the metallic line which appears when the strip 110 is formed into the edge guard 114 the material 118 presents a color-contrasting line when the strip 116 is formed into an edge guard 120 as shown by FIG. 12. Once again the size, location and number of such zones 118 will depend upon the appearance which is desired in any given edge guard. Once again it is advantageous to coextrude the material 118 by means of a second extruder whereby the entire insulation is applied to the metal strip in the flat. With this procedure, precision and accuracy, promoting desirable appearance characteristics, are efficiently achieved.

One of the special attributes of the invention relates to efficiently and economically fulfilling requirements for a range of various door edge guard colors for color coordination with a range of automobile paint colors. Where there is to be a change in color, it is possible to keep the line operable while changing color by switching operation from one extruder to another. For example consider the embodiment shown in FIG. 5.

Let it be assumed that the insulating material 84 is being applied in one particular color by one of the two extruders, and that this is the only insulating material required to be applied. By keeping the strip running through the extruder while the one extruder is placed off-line and the other extruder containing a different color material on-line, the change-over will be effective to cause a color change in the insulating material applied to the strip. An extruder can operate continuously as long as new raw plastic feed stock is fed into its hopper. As the material comes off the set of accumulator rolls 56, an operator can watch for a color change and cut the material at the appropriate point. This is an efficient way to keep the line running while performing a color change with a minimum production of scrap material.

Where the configuration of the insulating material on the edge guard is other than of a uniform characteristic, i.e. where two different colors are being applied by two extruders, and where it is desired to change one or both of these colors, there may be one or two additional extruders which are switched on-line while one or both of the first two extruders are moved off-line. While it is contemplated that the extruders can be switched on and off line while the line continues to run, it will be appreciated that a temporary stopping of the travel of the strip through the line might occur in certain situations.

Figure 4:
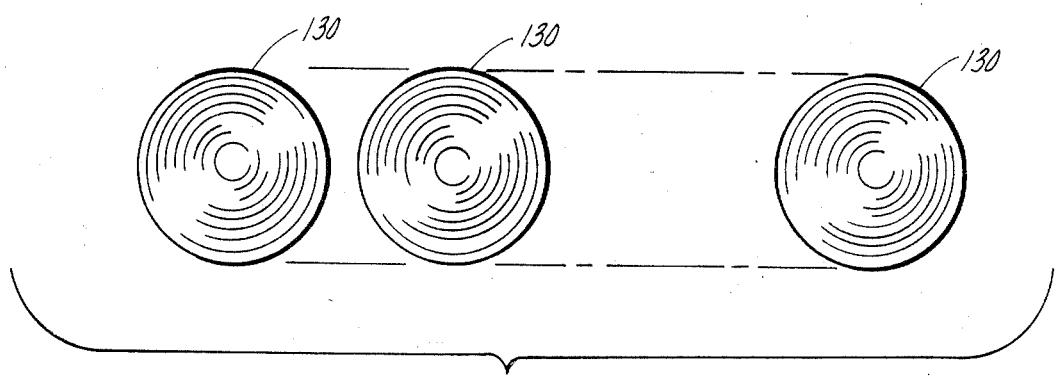
FIG. 4 is a view of the product produced by the method during a stage of the method.

The present invention provides the capability for reducing inventory requirement since the amount of material which is used for the insulation can be conformed to the particular mix of colors. In other words it is not necessary to buy minimum quantities of plastic sheet material as in the case of laminating but rather all that is required is to purchase raw plastic for use in the extruders. The amount of raw plastic purchased can correspond to production requirements for each given color. Color change is effected by merely switching in one extruder and switching out another extruder in the case of where a single color is to be changed. When a color is to be changed it is not necessary to have a number of extruders corresponding to each particular color. It is possible for the off-line extruder to be thoroughly cleaned and purged of the previously extruded color so that when a new color is used, the true and accurate color will appear in the insulating layer and will not be contaminated by the previous color. It is possible for a single extruder line to serve multiple roll-formers. Hence the invention provides, in addition to its economy and efficiency, numerous versatilities as far as use is concerned. If desired the coils of flat insulated strip can be stored for subsequent usage by roll-formers in accordance with production requirements for different edge guards and different colors with FIG. 4 showing a series of coils 130 of different colors.

The efficiency of operation is particularly advantageous where an edge guard is required to have a sweep corresponding to the contour of the particular door edge on which it is to be installed. For example, reference is made to applicant's U.S. Pat. No. 4,457,112 which shows an edge guard containing such sweep. By extruding the plastic material onto the flat metal strip before roll-forming rather than onto a roll-formed cross section, sweep can be imparted during roll-forming. If the insulating material is extruded onto a U-shaped cross section, which is more difficult than extruding in the flat, a requirement for sweep would involve an additional operation because extruding onto a U-shaped part with sweep would be even more difficult. With the present invention such difficulties are completely avoided. Therefore the invention has been shown to provide an advantageous, efficient and versatile improvement. The invention relates both to the process and features in the resultant edge guards constructions.

While a preferred embodiment of the invention has been disclosed, it will be appreciated that principles are applicable to other embodiments.

What is claimed is:

1. A process for making an insulated metal edge guard of generally U-shaped cross section which fits onto the trailing edge of a swinging closure wherein at least a portion of the exterior surface of the U-shaped cross section which is visible when the edge guard is installed on the trailing edge of the swinging closure is covered by insulating material which is color-coordinated with the color of the swinging closure, said process comprising extruding by means of an extruder a layer of a non-metallic colored insulating material onto a flat metal strip which is pulled through the extruder along a straight line, selectively one color after another, coiling the insulated strip after it has been pulled through the extruder, and while still in the flat, selectively into coils, one color after another, uncoiling at a roll-forming apparatus one of said coils containing insulating material of a desired color for color-coordination with a particular colored swinging closure and passing the uncoiled strip through the roll-forming apparatus to form the insulated strip into a U-shaped cross section for fitting onto the trailing edge of the swinging closure and wherein the extruder so extrudes the layer of insulating material onto the flat metal strip and the roll-forming apparatus so forms the strip into the U-shaped cross section that at least some of said insulating material is disposed on the exterior of the strip so as to be visible when the edge guard is installed on the trailing edge of the swinging closure.

2. An insulated edge guard made by the method of claim 1.

3. A process as set forth in claim 1 in which the layer of non-metallic insulating material is extruded by the extruder onto a surface of the metal strip, including the longitudinally extending margins, which is formed into the interior of the U-shaped cross section by the roll-forming apparatus and wherein the roll-forming apparatus rolls the longitudinally extending margins of the strip so as to form beads at the ends of the U-shaped cross section containing insulating material on the exterior of the U-shaped cross section.

4. An insulated edge guard made by the method of claim 3.

5. A process as set forth in claim 1 in which the extruder extrudes the non-metallic insulating material onto opposite surfaces of the metal strip, and the roll-forming apparatus roll forms the strip such that the insulating material on one of said surfaces of the strip is on the exterior of the U-shaped cross section.

6. An insulated edge guard made by the method of claim 5.

7. A process as set forth in claim 1 in which said extruder extrudes the non-metallic insulating material onto a surface of the flat metal strip while leaving a void on that surface and a second extruder extrudes non-metallic insulating material into said void.

8. An insulated edge guard made by the method of claim 7.

9. A process as set forth in claim 7 in which the first-mentioned extruder extrudes non-metallic material so as to leave a void of given width, and the second extruder extrudes insulating material into the void corresponding substantially to the void's width.

10. An insulated edge guard made by the method of claim 9.

11. A process as set forth in claim 1 in which a second extruder extrudes onto the strip non-metallic insulating material having a different physical characteristic from the non-metallic material extruded by the first-mentioned extruder.

12. An insulated edge guard made by the method of claim 11.

13. A process as set forth in claim 1 in which the extruder extrudes non-metallic insulating material onto a surface of the metal strip so as to leave a void, and the void is filled by another material.

14. An insulated edge guard made by the method of claim 13.

15. A process as set forth in claim 13 in which the void is filled by a light-reflective material.

16. An insulated edge guard made by the method of claim 15.

17. A process as set forth in claim 13 in which a material of different color from said non-metallic insulating material fills the void.

18. An insulated edge guard made by the method of claim 17.

19. A process for making a decorative and protective insulated metal molding of channel-shaped cross section which fits onto an object wherein at least a portion of the exterior surface of the channel-shaped cross section which is visible when the molding is installed on the object is covered by insulating material which is color-coordinated with the color of the object, said process comprising extruding by means of an extruder a layer of a non-metallic colored insulating material onto a flat metal strip which is pulled through the extruder along a straight line, selectively one color after another, coiling the insulated strip after it has been pulled through the extruder, and while still in the flat, selectively into coils, one color after another, uncoiling at a roll-forming apparatus one of said coils containing insulating material of a desired color for color-coordination with a particular colored object and passing the uncoiled strip through the roll-forming apparatus to form the insulated strip into a channel-shaped cross section for fitting onto the object and wherein the extruder so extrudes the layer of insulating material onto the flat metal strip and the roll-forming apparatus so forms the strip into the channel-shaped cross section that at least some of said insulating material is disposed on the exterior of the strip so as to be visible when the molding is installed on the object.

20. An insulated molding made by the method of claim 19.

21. A process as set forth in claim 19 in which the insulating material is extruded onto the metal strip on one major surface thereof and at least one of the side edge surfaces.

22. An insulating molding made by the method of claim 21.

* * * * *